(12) United States Patent
Sarikaya et al.

(10) Patent No.: US 8,625,609 B2
(45) Date of Patent: Jan. 7, 2014

(54) USING DHCPV6 AND AAA FOR MOBILE STATION PREFIX DELEGATION AND ENHANCED NEIGHBOR DISCOVERY

(75) Inventors: Behcet Sarikaya, Wylie, TX (US); Yangsong Xia, Nanjing (CN)

(73) Assignee: Futurewei Technologies Inc., Plano, TX (US)

( * ) Notice: Subject to any disclaimer, the term of this patent is extended or adjusted under 35 U.S.C. 154(b) by 235 days.

(21) Appl. No.: 11/747,101

(22) Filed: May 10, 2007

(65) Prior Publication Data
US 2007/0268919 A1 Nov. 22, 2007

Related U.S. Application Data

(60) Provisional application No. 60/801,924, filed on May 19, 2006, provisional application No. 60/804,253, filed on Jun. 8, 2006, provisional application No. 60/821,855, filed on Aug. 9, 2006.

(51) Int. Cl.
*H04L 12/28* (2006.01)
*H04L 12/50* (2006.01)
*H04B 7/216* (2006.01)

(52) U.S. Cl.
USPC ........... 370/401; 370/320; 370/335; 370/342; 370/349; 370/389; 370/392

(58) Field of Classification Search
USPC .............................. 370/338, 395.52; 455/561
See application file for complete search history.

(56) References Cited

U.S. PATENT DOCUMENTS

| | | | |
|---|---|---|---|
| 6,798,763 B1 * | 9/2004 | Kimura et al. | 370/338 |
| 6,930,988 B2 | 8/2005 | Koodli et al. | |
| 7,039,035 B2 | 5/2006 | Droms et al. | |
| 2004/0179539 A1 | 9/2004 | Takeda et al. | |
| 2004/0202168 A1 | 10/2004 | Matsuhira et al. | |
| 2004/0205211 A1 * | 10/2004 | Takeda et al. | 709/230 |
| 2005/0117590 A1 * | 6/2005 | Ronneke | 370/395.52 |
| 2005/0165953 A1 | 7/2005 | Oba et al. | |

(Continued)

FOREIGN PATENT DOCUMENTS

| | | |
|---|---|---|
| CN | 1531263 A | 9/2004 |
| CN | 1744597 | 3/2006 |

(Continued)

OTHER PUBLICATIONS

Huawei Technologies Co., Ltd.; PCT/CN2007/080031; PCT International Search Report; Aug. 23, 2007; 4 pgs.

(Continued)

*Primary Examiner* — Hassan Phillips
*Assistant Examiner* — Lonnie Sweet
(74) *Attorney, Agent, or Firm* — Slater & Matsil, L.L.P.

(57) ABSTRACT

A network component comprising a processor configured to implement a method comprising promoting transmission of a request for an address prefix to a prefix issuing party, identifying a reply comprising the address prefix from the prefix issuing party, and promoting transmission of a router advertisement comprising the address prefix to a mobile station. Also disclosed is a method comprising receiving a request for an Internet Protocol version 6 (IPv6) prefix, assigning the IPv6 prefix to a mobile station, and sending the IPv6 address to the mobile station, wherein the method is implemented at a Dynamic Host Configuration Protocol (DHCP) server or an Authentication, Authorization and Accounting (AAA) server.

18 Claims, 12 Drawing Sheets

(56) References Cited

U.S. PATENT DOCUMENTS

| | | | |
|---|---|---|---|
| 2005/0174984 A1 | 8/2005 | O'Neill | |
| 2005/0237983 A1* | 10/2005 | Khalil et al. | 370/338 |
| 2005/0259626 A1* | 11/2005 | Devarapalli et al. | 370/338 |
| 2005/0265360 A1* | 12/2005 | Kim et al. | 370/400 |
| 2006/0002406 A1 | 1/2006 | Ishihara et al. | |
| 2006/0019708 A1* | 1/2006 | Raman et al. | 455/561 |
| 2006/0067350 A1 | 3/2006 | Clevy et al. | |
| 2006/0080728 A1 | 4/2006 | Wen et al. | |
| 2006/0140164 A1* | 6/2006 | Patel et al. | 370/338 |
| 2006/0159100 A1 | 7/2006 | Droms et al. | |
| 2006/0184692 A1 | 8/2006 | Ikeda | |
| 2006/0221921 A1 | 10/2006 | Kniveton | |

FOREIGN PATENT DOCUMENTS

| | | |
|---|---|---|
| CN | 1901551 A | 1/2007 |
| EP | 1 681 895 A2 | 7/2006 |
| KR | 20050048383 | 5/2005 |
| WO | 0154437 A1 | 7/2001 |
| WO | 03084147 A1 | 10/2003 |
| WO | WO 2007/009367 A1 | 1/2007 |

OTHER PUBLICATIONS

Huawei Technologies Co., Ltd.; PCT/CN2007/080031; PCT Written Opinion of the International Searching Authority; Aug. 23, 2007; 4 pgs.

Chinese Office Action and partial translation received in Chinese Patent Application No. 200780018362.1, mailed Nov. 5, 2010, 16 pages.

Chinese Office Action and translation received in Chinese Patent Application No. 200780018362.1, mailed May 17, 2011, 20 pages.

Chinese Office Action and translation received in Chinese Patent Application No. 200780018362.1, mailed Feb. 21, 2012, 20 pages.

European Office Action received in European Application No. 07721654.7-1244, mailed Apr. 29, 2010, 5 pages.

European Office Action received in European Application No. 07721654.7-1244, mailed Sep. 29, 2010, 3 pages.

Rejection Decision of Chinese Application No. 200780018362.1, PCT Application Entering the National Phase, mailing date Sep. 5, 2012, with partial translation, 26 pages.

* cited by examiner

USING DHCPV6 AND AAA FOR MOBILE STATION PREFIX DELEGATION AND ENHANCED NEIGHBOR DISCOVERY

CROSS-REFERENCE TO RELATED APPLICATIONS

This application claims priority to U.S. Provisional Application Ser. No. 60/801,924 filed May 19, 2006 by Xia et al. and entitled "Duplicate Address Detection Optimization Using Enhanced Neighbor Discovery," U.S. Provisional Application Ser. No. 60/804,253 filed Jun. 8, 2006 by Xia et al. and entitled "Duplicate Address Detection Optimization Using Enhanced Neighbor Discovery," and U.S. Provisional Application Ser. No. 60/821,855 filed Aug. 9, 2006 by Sarikaya et al. and entitled "Using DHCPv6 for Mobile Station Prefix Delegation," which are all incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In modern wireless access networks, mobile stations (MSs) can be any type of portable communication or computer device that is assigned a network address to facilitate communications between the customer and the service provider. The network address is needed to ensure the transportation and delivery of data to the specified customer. In the Internet Protocol version 6 (IPv6) network layer protocol, network addresses are 128 bits in length, where the first 64 bits are referred to as a prefix and the remaining 64 bits are referred to as an interface identifier. The prefix is typically assigned by the access router (AR) to which the MS is connected, while the interface identifier is created by the MS. A duplicate address detection (DAD) process may be implemented to prevent duplicate address assignments to multiple MSs in the network. Once the uniqueness of the address has been verified, the MS may use the address to communicate with other networks or MSs. When the MS moves to a new AR, a new prefix is assigned and the DAD process may be repeated.

While the existing address assignment methods are suitable for low Quality of Service (QoS) applications, such as web browsing, they may be insufficient for higher QoS applications, such as Voice over IP (VoIP). Specifically, the task of assigning and managing address prefixes increases the processing load of the AR. The bandwidth reduction may degrade the service to the MS when multiple MSs are connected to the AR. In addition, the duplicate address detection scheme causes communication delays that may not be tolerable in some time-critical mobile applications, such as VoIP. Thus, there is a need for improving address assignment in wireless networks.

SUMMARY

In a first embodiment, the disclosure includes a network component comprising a processor configured to implement a method comprising promoting transmission of a request for an address prefix to a prefix issuing party, identifying a reply comprising the address prefix from the prefix issuing party, and promoting transmission of a router advertisement comprising the address prefix to a mobile station.

In a second embodiment, the disclosure includes a method comprising receiving a request for an Internet Protocol version 6 (IPv6) prefix, assigning the IPv6 prefix to a mobile station, and sending the IPv6 address to the mobile station, wherein the method is implemented at a Dynamic Host Configuration Protocol (DHCP) server or an Authentication, Authorization and Accounting (AAA) server.

In a third embodiment, the disclosure includes a communications system comprising a plurality of base stations in communication with a plurality of mobile stations, and an access router in communication with the base stations and a prefix issuing party, wherein communications between the access router and the prefix issuing party are routed through the home agent, wherein the prefix issuing party is configured to issue an address prefix to at least some of the mobile stations, wherein at least some of the mobile stations are configured to use the address prefixes to create an internet protocol version 6 (IPv6) address.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is an improved address assignment method for MSs in a wireless access network. Specifically, a prefix issuing party assigns the prefixes to each MS, which decreases the workload on the AR. If desired, the prefix may be a home network prefix. In such a case, the prefix assignment process can be conducted by a Home Agent using Proxy Mobile IPv6. Once the prefix is assigned to the MS, the MS may create an address by combining the prefix with its interface identifier. The uniqueness of the address may be verified using an enhanced DAD method. Briefly, the enhanced DAD method compares the address to an address cache, makes a positive determination as to whether the address is unique, and sends a router advertisement to the MS indicating the uniqueness of the address. The improved address assignment method may be faster, less resource intensive, and/or less cumbersome than previous address assignment methods.

Figure 1A:
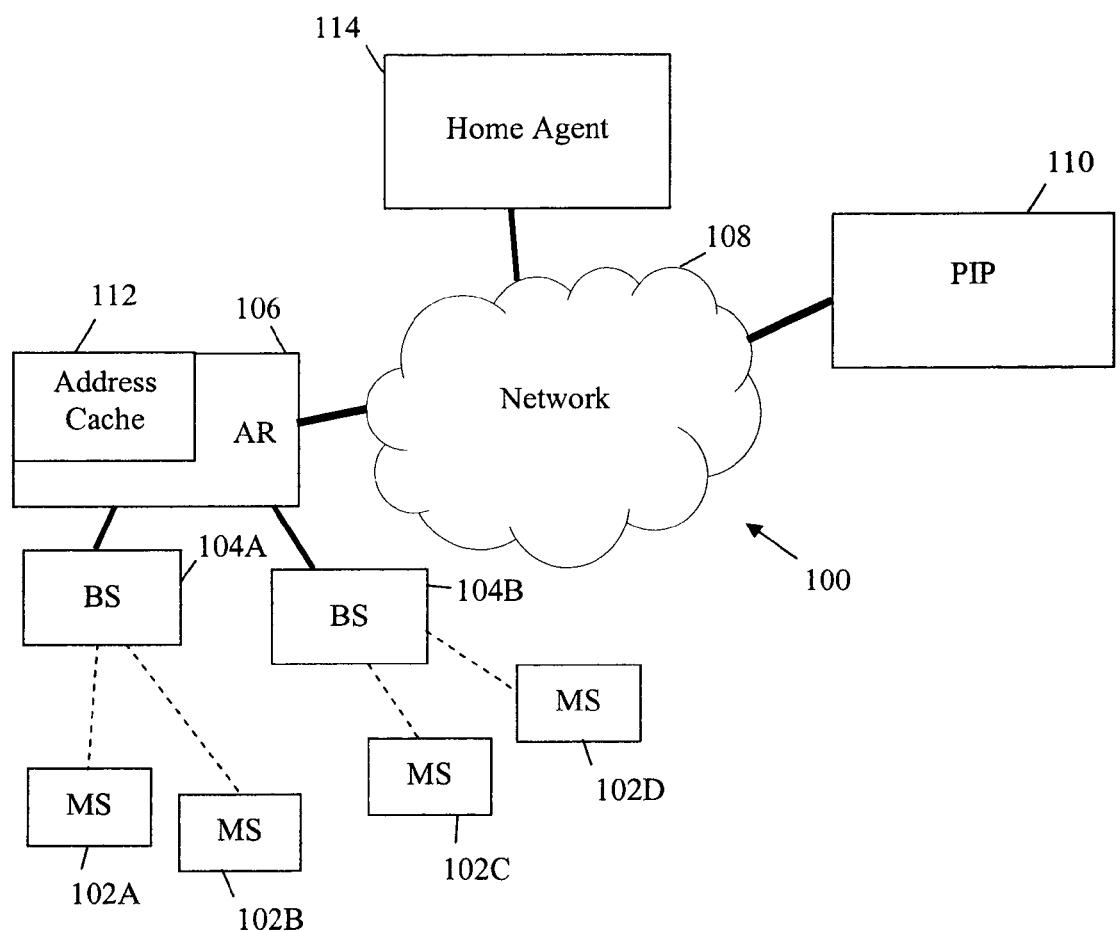
FIG. 1A is an illustration of one embodiment of a wireless access network.

FIG. 1A illustrates one embodiment of a system 100 that assigns addresses in a wireless access network. The system 100 comprises a plurality of MSs 102A, 102B, 102C, 102D (collectively, 102), a plurality of Basic Stations (BS) 104A, 104B (collectively, 104), an AR 106, a Network 108, a Prefix Issuing Party (PIP) 110, an Address Cache 112, and a Home Agent 114. The MSs 102 may communicate with the BSs 104 via wireless links, while the BSs 104, the AR 106, the Network 108, the PIP 110, and the Home Agent 114 may communicate with each other via fixed links. It should be recognized that while FIG. 1A illustrates the system 100 with four MSs 102, two BSs 104, and one AR 106, the system 100 could accommodate any number of MSs 102, BSs 104, and ARs 106.

In an embodiment, the MSs 102 may be any mobile devices, components, or networks that use the AR 104 to access the Network 108 and/or a third party. Specifically, the MSs 102 may be mobile user-oriented devices that communicate with the AR 104 via the BSs 104. For example, the MSs 102 may be cellular phones, notebook computers, personal digital assistants (PDAs), or any other wireless devices. Alternatively, the MSs 102 may be mobile nodes that pass data from the Network 108 to an external network, such as wireless routers (not shown).

In an embodiment, the BSs 104 may be any devices, components, or networks that connect to the MSs 102 to the AR 106. For example, the BSs 104 may be fixed devices that are connected to the AR 106 via an Ethernet link and to the MSs 102 via a wireless link. The BSs 104 may also manage connectivity and transport data between the MSs 102 and the AR 106. Specifically, the BSs 104 may relay Neighbor Solicitation (NS) messages from the MSs 102 to the AR 106, and relay Router Advertisement (RA) messages from the AR 106 to the MSs 102. The BSs 104 may also relay other types of messages between the MSs 102 and the AR 106.

In an embodiment, the AR 106 is a device, component, or network that allows the MSs 102 to communicate with the Network 108 and/or a third party network. Specifically, the AR 106 may be the first Internet Protocol (IP) router that the MSs 102 encounter, such as a Broadband Remote Access Service (BRAS), a Media Access Gateway (MAG), or an Access Service Network Gateway (ASN-GW). The AR may be a Packet Data Servicing Node (PDSN) in a 3GPP2 network, or a Gateway GPRS Support Node (GGSN) in a 3GPP network. In another embodiment, the AR 106 may be a node that forwards IPv6 packets that are not explicitly addressed to the AR 106. The AR 106 may also be any fixed point that provides wireless access network coverage to the MSs 102. The AR 106 may communicate with the MSs 102 through a fixed link to the BSs 104, or may communicate directly with the MSs 102 via a wireless link. The AR 106 may also communicate with the Network 108 and/or a third party network using a fixed link. Specifically, the AR 106 may receive a prefix request from one of the MSs 102 that wishes to join the network, and may relay the prefix request to the PIP 110. The AR 106 may also receive prefixes from the PIP 110, and forward the prefixes to the MSs 102.

In an embodiment, the Network 108 may be any of various types of networks that exchange data between the AR 106, the Home Agent 114, and the PIP 110. For example, the Network 108 may be a Packet Switched Network (PSN), an Intranet, an Internet, a local area network (LAN), a public switched telephone network (PSTN), or any other network. The Network 108 may also be an Ethernet transport network, a backbone network, an access network, an optical network, a wire-line network, an IEEE 802 network, or a wireless network, such as a cellular network. Persons of ordinary skill in the art are aware of other embodiments of the Network 108.

In an embodiment, the PIP 110 may be any device, component, or network that has the authority to delegate IP address prefixes to the MSs 102. The PIP 110 may assign prefixes to the MSs 102 globally, or the PIP 110 may be limited to assigning prefixes to MSs 102 within a specified network. In a specific embodiment, the PIP 110 may be a Dynamic Host Configuration Protocol (DHCP) server that communicates with the AR 106 using a DHCP protocol, such as DHCPv6 or any other DHCP protocol. In such a case, the PIP 110 may use DHCPv6 to receive prefix requests from the AR 106, assign address prefixes to the MSs 102, and send the address prefixes to the AR 106. Alternatively, the PIP 110 may be an Authentication, Authorization, and Accounting (AAA) server that communicates with the AR 106 using an AAA protocol, such as RADIUS, DIAMETER, or any other AAA protocol. In such a case, the PIP 110 may use the AAA protocol to receive AAA Access-Request (AA-Request) messages from the AR 106, assign address prefixes to the MSs, and send the address prefixes to the AR 106 using Access-Accept (AA-Answer) messages.

The system 100 may also contain an Address Cache 112. The Address Cache 112 may be a database, cache, or memory storage containing the IP address information for the MSs 102 and any other IP nodes in communication with the AR 106. The address information may include all of the global IP addresses, may be limited to the IP address with a network, or may be limited to the IP addresses associated with the AR. The Address Cache 112 may be managed by the AR 106 or a Neighbor Discovery (ND) node. In an embodiment, the entries in the Address Cache 112 may be maintained using information that passes through the AR 106 or ND node, such as DAD NS or RA messages. Specifically, an entry in the Address Cache 112 may be created when one of the MSs 102 is assigned a unique address. Similarly, an entry in the Address Cache may be deleted when the MS 102 is no longer associated with the AR 106, such as when the AR 106 receives a deregistration message from one of the MSs 102 or another entity that is authorized to deregister the MS 102. Alternatively, the Address Cache 112 may be created and modified by any other methods known to persons of ordinary skill in the art.

In an embodiment, the Home Agent 114 may be any IPv6 device, component, or network that may manage at least some of the AR's responsibilities. Specifically, the Home Agent 114 may be a Local Mobility Anchor (LMA) of Proxy Mobile IPv6, a PDSN in a 3GPP network, or a GGSN in a 3GPP2 network. The Home Agent 114 may act as a DHCP client or an AAA client, instead of the AR 106. The Home Agent 114 may also contain the Address Cache 112. In addition, the Home Agent 114 may handle IP routing for the MSs 102 that may roam into a foreign network. In an embodiment, the Home Agent 114 may establish a direct connection or indirect connection with the AR 106 through the Network 108.

The components described above may communicate with each other via fixed and/or wireless links using a variety of technologies. The wireless links may be created dynamically when one of the MSs 102 attaches to the AR 106 directly or through the BSs 104. Examples of wireless link technologies include Worldwide Interoperability for Microwave Access (WiMAX), Wireless Fidelity (WiFi), Code Division Multiple Access (CDMA), Wideband CDMA (WCDMA), Orthogonal Frequency Division Multiple Access (OFDMA), Time Division Multiple Access (TDMA), Global System for Mobile communications (GSM), Enhanced Data for GSM Evolution (EDGE), Universal Mobile Telecommunication Systems (UMTS), Third Generation Partnership Project (3GPP), Third Generation Partnership Project 2 (3GPP2), Advanced Mobile Phone Service (AMPS), one of the Institute of Electrical and Electronic Engineers (IEEE) 802 wireless networks such as 802.16d/e, or any other wireless network. The remaining components may be coupled together via fixed links, such as electrical or optical links. Examples of fixed link technologies include Ethernet, Asynchronous Transfer Mode (ATM), Synchronous Optical Network (SONET), and Synchronous Digital Hierarchy (SDH). The fixed and wireless links may have a fixed bandwidth such that a fixed amount of data is transported over the link, or may have a variable-sized bandwidth.

Figure 1B:
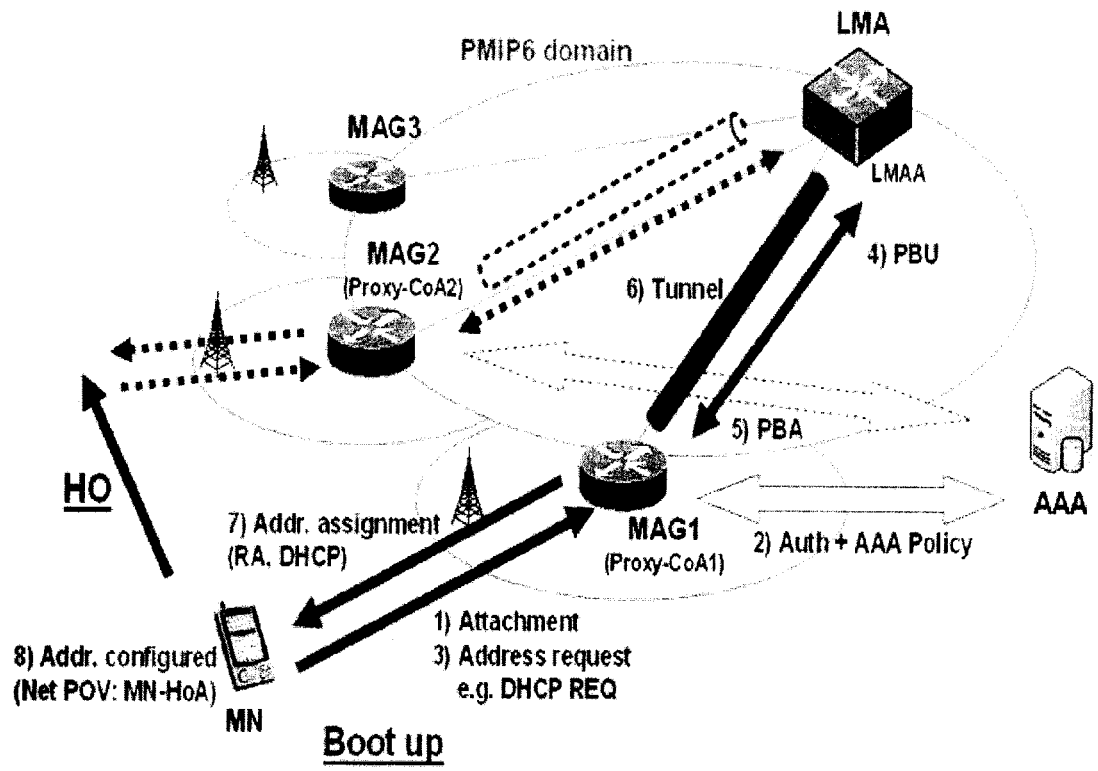
FIG. 1B is an illustration of another embodiment of the wireless access network.

FIG. 1B illustrates a specific embodiment of the Proxy Mobile IPv6 system. Proxy Mobile IPv6 provides network based mobility support to mobile nodes, and comprises the MAG and the LMA. The MAG is an AR that performs mobility signaling on behalf of MS. The LMA is Mobile IPv6 Home Agent with some extensions. In Proxy Mobile IPv6, MS is not aware of any mobility signaling. The MS makes an address request possibly using DHCP Request. The network provides a per-MS prefix for the MS from MS's home link where LMA resides. A home address is assigned to MS from this home network prefix and a tunnel is established between MAG and LMA. As illustrated in FIG. 1B, the MS's traffic is tunneled back and forth to the LMA, so the MAG assures that MS is virtually on its home link.

Figure 2:
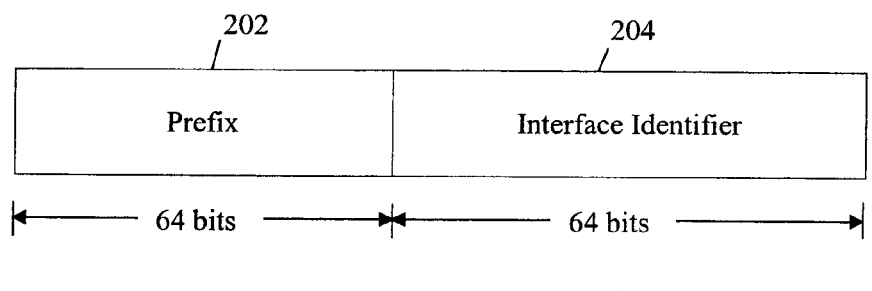
FIG. 2 is an illustration of one embodiment of an address format.

FIG. 2 is an embodiment of an address format 200 that may be assigned to a MS or any other IP network node. The address may comprise a 64-bit prefix 202 and a 64-bit interface identifier 204. The prefix 202 may be issued by the PIP, and may be globally unique, unique to the PIP, unique to the AR, or not unique. The interface identifier 204 is typically generated by or associated with the MS, although a plurality of interface identifiers 204 may be associated with a single MS. The prefix 202 and/or the interface identifier 204 may be static or dynamic, and may be similar to medium access control (MAC) addresses.

The PIP may delegate the prefix 202 using a point-to-point model or a shared prefix model. In the point-to-point model, each prefix 202 is assigned to only one MS; however, each MS may be assigned multiple prefixes 202. In the shared prefix model, a single prefix 202 may be shared by all of the MSs associated with a single AR. In either case, the PIP may manage prefix assignment for incoming MSs, renew prefixes for existing MSs, and release prefixes for departing MSs. Moreover, the AR or Home Agent may act as a relay between the PIP and the MSs.

Alternatively or additionally, the MSs may be assigned addresses 200 using a stateless or a stateful address configuration model. Stateless configuration may require no manual configuration of MSs, minimal configuration of the AR, and no additional servers. The stateless mechanism allows a MS to generate its own addresses using a combination of locally available information and information advertised by ARs. ARs advertise prefixes that identify the subnet(s) associated with a link, while MSs generate an interface identifier that uniquely identifies an interface on a subnet. An address is formed by combining the two. In the stateful configuration model, MSs obtain interface addresses and/or configuration information and parameters from a server, such as the PIP. The servers maintain a cache or database that keeps track of which prefixes and/or addresses have been assigned to which MSs. The stateful configuration protocol allows MSs to obtain addresses, other configuration information, or both from a server. In both address configuration models, the AR acts as a relay in that it relays prefix requests and responses between the MSs and the PIP. In addition, a DAD procedure may be used to verify the uniqueness of the MS address in a stateless or a stateful addressing scheme.

Figure 3A:
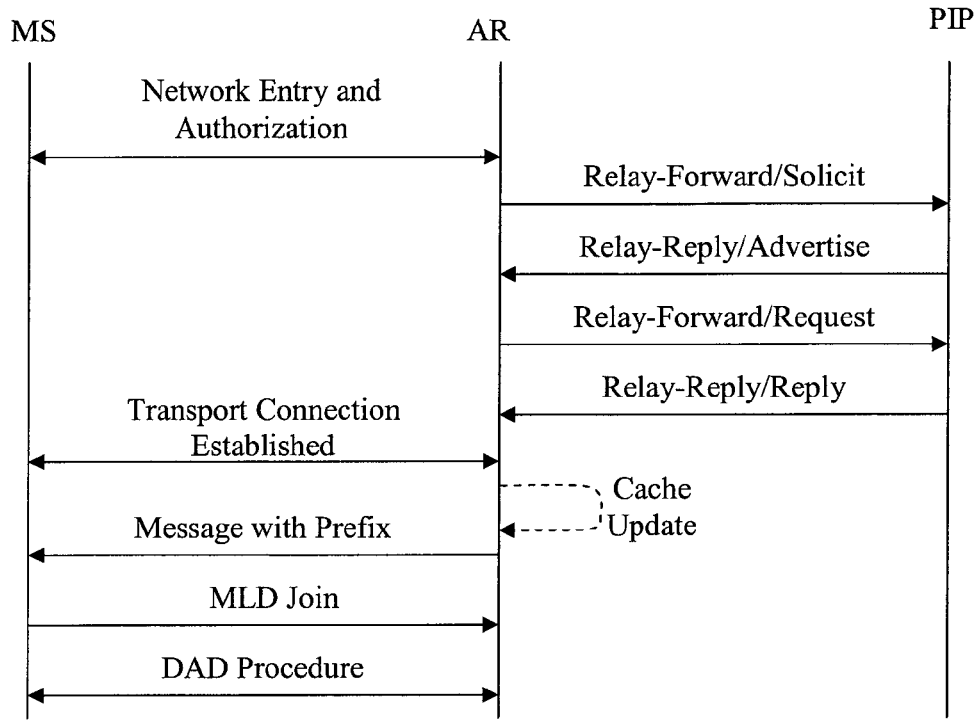
FIG. 3A is an illustration of one embodiment of a prefix assignment process.

FIG. 3A illustrates an embodiment of a prefix assignment process. Rather than the AR assigning the prefix to the MS, the PIP assigns the prefix to the MS and sends to the prefix to the MS via the AR. In an embodiment, the prefix assignment process may be started when the MS enters the network, such as when the MS performs the initial network entry and authentication procedures with the AR. Alternatively, the prefix assignment process may begin when the MS sends the AR a prefix request, such as a NS message. After the MS enters the network or upon receipt of the NS message, the AR may obtain the prefix for the MS from the PIP using the PIP's protocol, e.g. DHCPv6, RADIUS, DIAMETER, or another suitable protocol. Specifically, when the PIP is a DHCP server, the AR and the PIP may engage in the four-part Solicit, Advertise, Request, and Reply process shown in FIG. 3A. If the PIP is an AAA server, the AR may send an AA-Request message to the AAA server, and the AAA server may send an AA-Answer message to the AR. In either case, the final message to the AR, e.g. the DHCP Reply or the AA-Answer, will contain the prefix assigned by the PIP.

In some embodiments, each AR may be assigned a /32 or /48 prefix and each MS may be assigned a /64 prefix, where the /64 prefix is an extension of the /48 prefix. For example, when an AR's /48 prefix is 3FFE:FFFF:0::/48, an MS is assigned the 3FFE:FFFF:0:2::/64 prefix. The AR may then only broadcast its /48 prefix information to the Internet. In such cases, the messages sent to the PIP may include a hint that the AR prefers a certain type of prefix, for example a /48 prefix. In such cases, the PIP may delegate a /64 prefix that is an extension of the /48 prefix.

A transport connection may then be established between the AR and the MS. The AR may then forward the prefix to the MS using either ND, e.g. an RA message, or the PIP's protocol, e.g. DHCP, RADIUS, or DIAMETER. If the PIP is a DHCP server, the prefix may be delivered to the MS using a DHCP Identity Association for Prefix Delegation (IA_PD) Prefix option and a RA Prefix Information option. An AR may be assigned a plurality of IA_PDs, each of which has an Identity Association Identifier (IAID). The use of the two protocols may increase the efficiency of the network by moving the complicated prefix management to a dedicated network entity, such as the PIP. The AR may also use the prefix to update its Address Cache. The MS may then construct a solicited node multicast address for the corresponding local link address and send the Multicast Listener Discovery (MLD) Join request for the solicited node multicast address. Finally, the MS may verify the address uniqueness using a DAD NS message, as described in further detail below. If the prefix has a predetermined expiration time, the MS may periodically send a renew message to the PIP or another party so that the predetermined time period can be extended or a new prefix can be issued to the MS.

In an alternative embodiment, the MS may send the prefix request through the Home Agent. In such a case, the communications between the MS and the Home Agent are relayed through the AR and optionally the BS. The Home Agent then performs the AR functions illustrated in FIG. 3. Specifically, the Home Agent communicates with the PIP to obtain the prefix for the MS. The Home Agent then sends the prefix to the MS via the AR and optionally the BS. The Home Agent may also update its Address Cache by adding the prefix to the Address Cache. Several specific embodiments of this process are illustrated below.

Figure 3B:
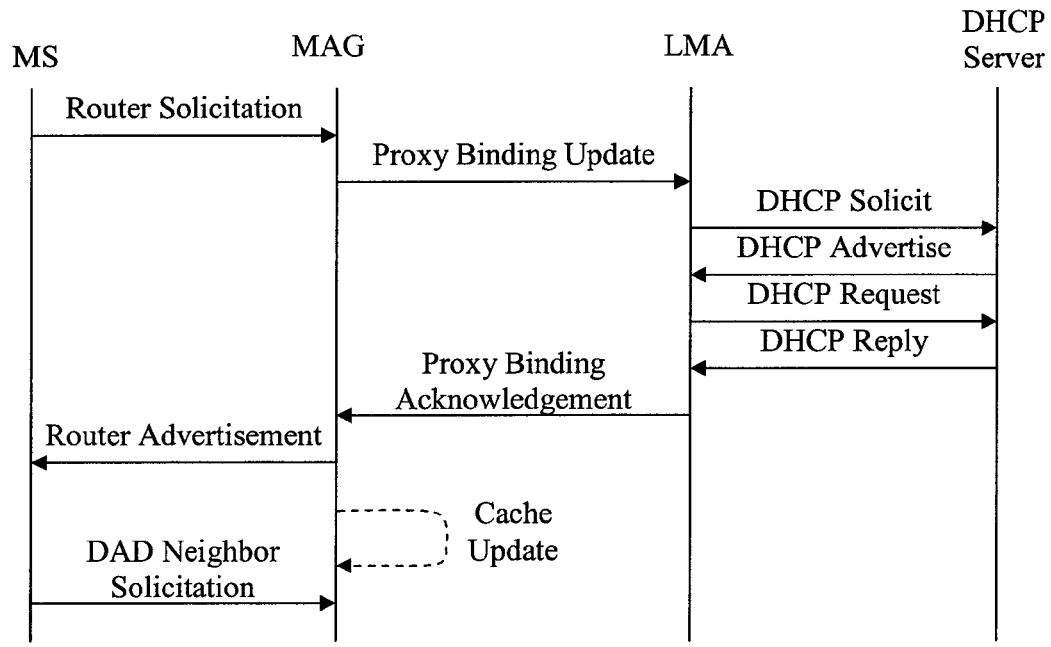
FIG. 3B is an illustration of another embodiment of the prefix assignment process.

FIG. 3B illustrates a specific embodiment of the stateless proxy mobile IPv6 home network prefix assignment process using the Home Agent. In the present embodiment, the AR is a MAG, the Home Agent is a LMA, and the PIP is a DHCP server. Unlike some embodiments discussed below, the present embodiment does not use a policy profile or policy store. The process may begin when a MS solicits a RA. The MAG may then send a Proxy Binding Update (PBU) message to the LMA, which contains a Home Network Prefix (HNP) set to zero. The LMA may then request a prefix for the MS by creating and sending a DHCP Solicit message to the DHCP server. The LMA may include an IA_PD or an IAID in the Solicit message.

The DHCP server may then send a DHCP Advertise message to the LMA. The LMA may then use the messages to obtain or update the prefix from the DHCP server. Specifically, the LMA and the DHCP server may use the IA_PD Prefix option to exchange information about the prefix in much the same way as IA Address options are used for assigned addresses, e.g. using the Request and Reply messages. The LMA may store the prefix information it receives in the Reply message. The LMA may then reply to the PBU with a Proxy Binding Acknowledgement (PBA) containing the MS's prefix in the HNP field. The MAG may then advertise the prefix to the MS with a RA. The MAG may update the Address Cache, if desired. Finally, the MS verifies the address uniqueness by sending a DAD NS. In the present embodiment, the LMA may have a DHCP client, and the DHCP server may be directly connected to the LMA. Also, the DHCP messages may be relayed using the DHCP relay function in the LMA if the LMA and DHCP server are not directly connected.

Figure 3C:
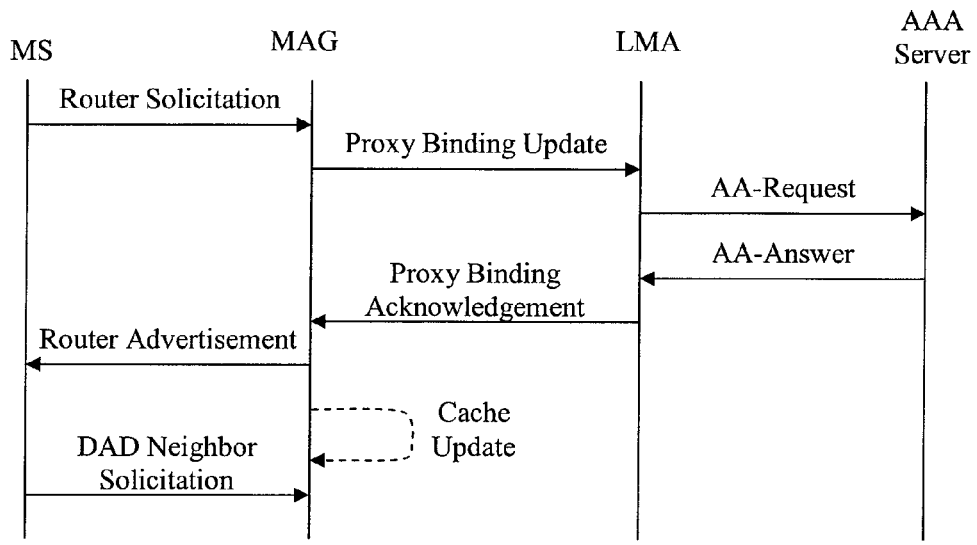
FIG. 3C is an illustration of another embodiment of the prefix assignment process.

FIG. 3C illustrates another embodiment of the stateless proxy mobile IPv6 home network prefix assignment process using the Home Agent. In the present embodiment, the AR is a MAG, the Home Agent is a LMA, and the PIP is an AAA server. The present embodiment does not use a policy profile or policy store. The process may begin when the MS solicits a RA. The MAG may then send a PBU to the LMA with the HNP set to zero. The LMA, as an AAA Protocol client, may send an AA-Request message with the MS's information to the AAA server. If the MS passes the authentication, the AAA server may send the AA-Answer message with the prefix information to the LMA. The delegated IPv6 prefix attribute may appear in an AA-Request packet as a hint by the LMA that it would prefer a specific type of prefix, for example, a /48 prefix. The AAA server may delegate a /64 prefix which is an extension of the /48 prefix in an AA-Request message containing a Delegated-IPv6-Prefix attribute. The attribute may appear multiple times when the AAA server assigns multiple prefixes to the MS. The remaining steps are as described above.

Figure 3D:
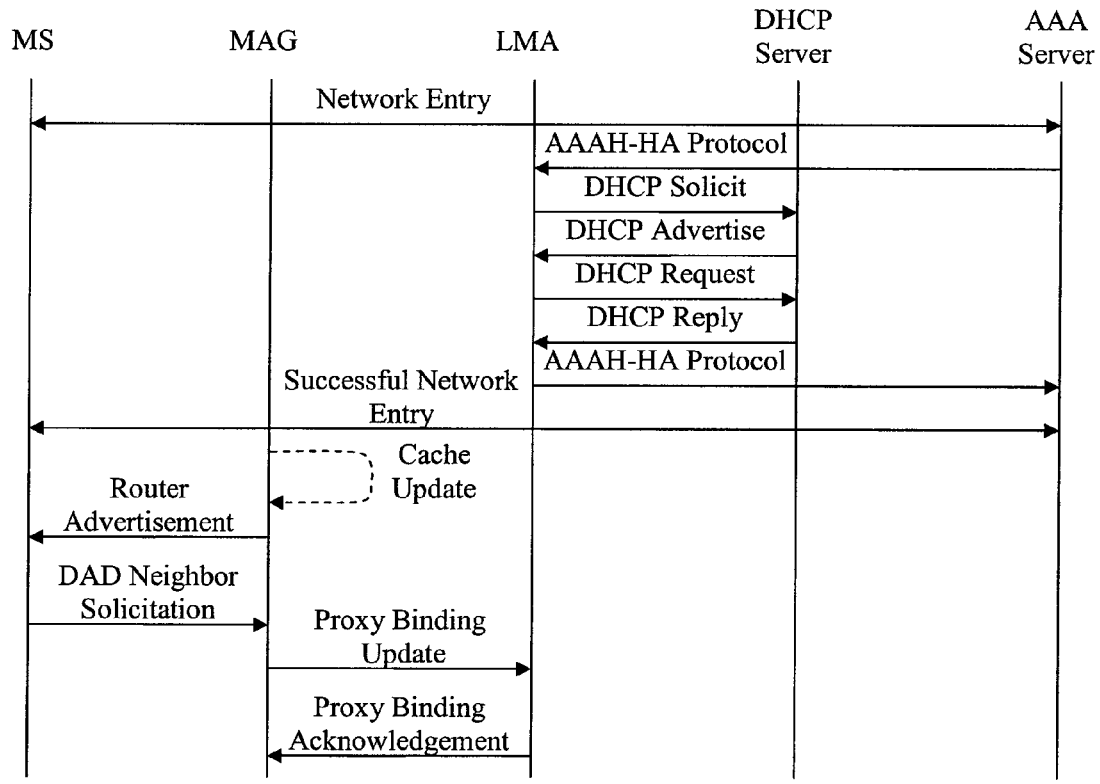
FIG. 3D is an illustration of another embodiment of the prefix assignment process.

FIG. 3D illustrates another embodiment of the stateless proxy mobile IPv6 home network prefix assignment process using the Home Agent. In the present embodiment, the AR is a MAG, the Home Agent is a LMA, and the PIP is a DHCP server. The present embodiment also uses a policy profile or store. The process may begin when an MS boots up in the network and goes through the Extensible Authentication Protocol (EAP) exchanges. The DHCP server may not be involved in the network entry procedures. The network may then ask the Home Agent/LMA for the home network prefix for the MS. The LMA and DHCP server may then perform the DHCP Solicit, Advertise, Request, and Reply process described above. The LMA may then reply with MS's prefix, at which point the successful network entry may terminate, and the MAG may get the HNP. The MAG may update the Address Cache, if desired. The MAG may then advertise the prefix to the MS using a RA. The MS may then verify the address uniqueness by sending a DAD NS. The MAG may then send a PBU with the assigned HNP to the LMA. Finally, the LMA may reply with a PBA, and establish a MAG-LMA tunnel.

Figure 3E:
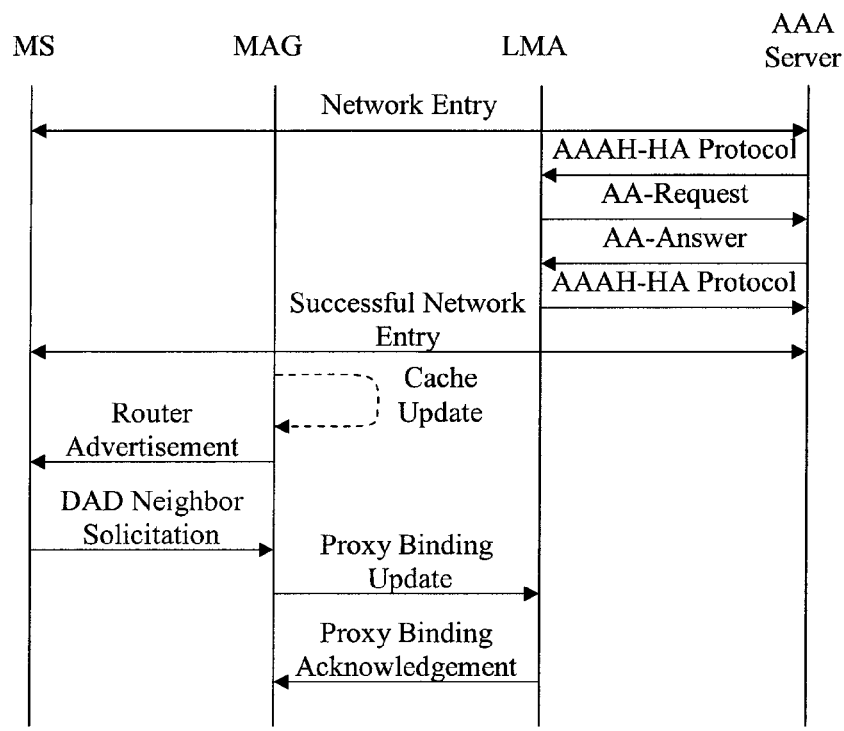
FIG. 3E is an illustration of another embodiment of the prefix assignment process.

FIG. 3E illustrates another embodiment of the stateless proxy mobile IPv6 home network prefix assignment process using the Home Agent. In the present embodiment, the AR is a MAG, the Home Agent is a LMA, and the PIP is an AAA server. The present embodiment also uses a policy profile or store. The process may begin when the MS boots up in the network and goes through the EAP exchanges. The network may then ask the home agent/LMA for the home network prefix hint for the MS. The LMA and AAA server may then perform the AA-Request and AA-Answer process described above. The LMA may then confirm MS's prefix, at which point the successful network entry may terminate, and the MAG may get the HNP. The MAG may update the Address Cache, if desired. The MAG may then advertise the prefix to MS with a RA. If stateful address configuration is used, the MAG may send the DHCP reply with the MS's home address assigned from the home network prefix. The MS may then verify the address uniqueness by sending a DAD NS. The MAG may then send a PBU with the assigned HNP. Finally, the LMA may reply with a PBA and establish the MAG-LMA tunnel.

Figure 3F:
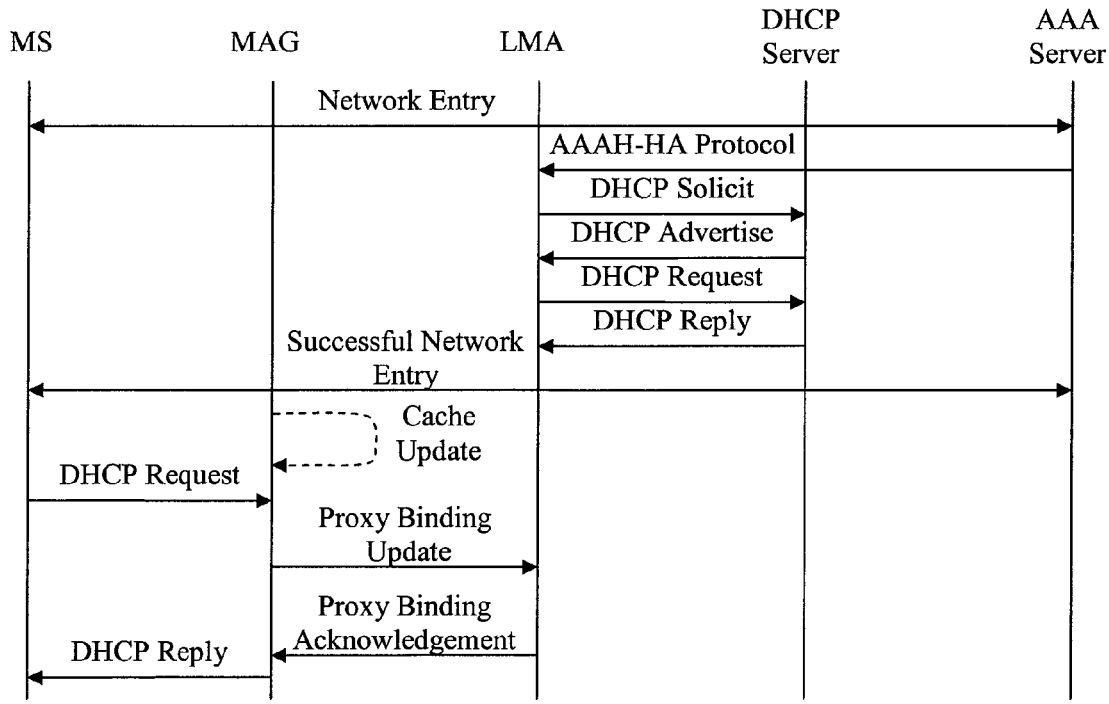
FIG. 3F is an illustration of another embodiment of the prefix assignment process.

FIG. 3F illustrates a specific embodiment of the stateful proxy mobile IPv6 home network prefix assignment process using the Home Agent. In the present embodiment, the AR is a MAG, the Home Agent is a LMA, and the PIP is a DHCP server. The process may begin as described in FIG. 3D above, that is the MS may enter the network and the LMA may assign its HNP using DHCPv6. The MAG may update the Address Cache, if desired. The MS may then request an address from the local DHCP proxy/server co-located in the MAG. The MAG may then send a PBU to the LMA with the HNP set to zero. The LMA may reply with a PBA and may set its HNP parameter. Finally, the DHCP Proxy may assign a MS-Home Address (HoA) from this prefix, and may send it to the MS in the DHCP Reply.

Figure 3G:
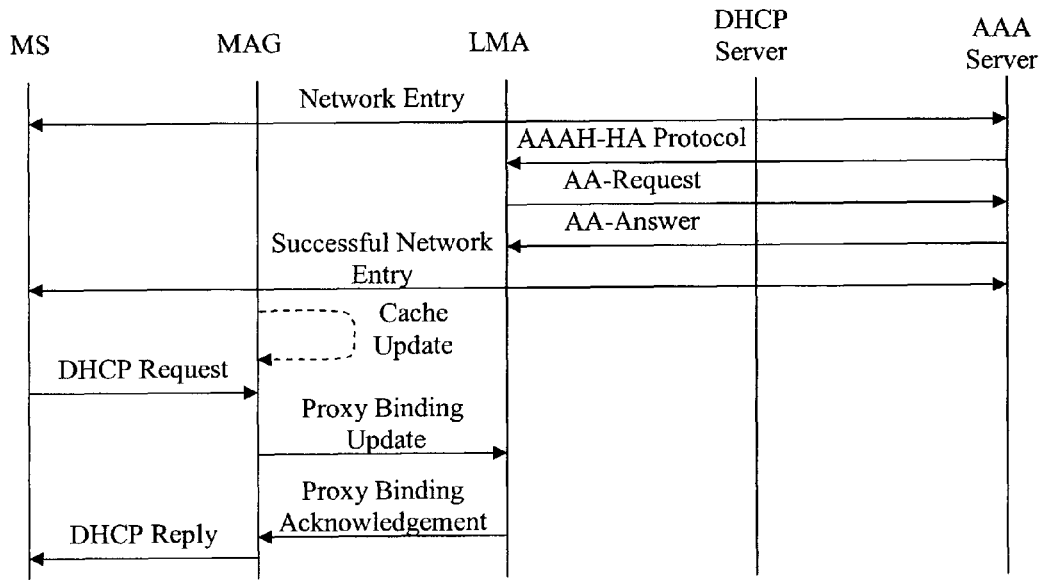
FIG. 3G is an illustration of another embodiment of the prefix assignment process.

FIG. 3G illustrates another embodiment of the stateful proxy mobile IPv6 home network prefix assignment process using the Home Agent. In the present embodiment, the AR is a MAG, the Home Agent is a LMA, and the PIP is a DHCP server. The process may begin as described in FIG. 3E above, that is the MS may enter the network, and the LMA may assign its HNP using an AAA Protocol. The MAG may update the Address Cache, if desired. The MS may then request an address from the local DHCP proxy/server co-located in MAG. The MAG may then send a PBU to the LMA with the HNP set to zero. The LMA may reply with a PBA and set its HNP parameter. The DHCP Proxy may then assign the MS-HoA from this prefix, and send it to the MS in a DHCP Reply.

Figure 3H:
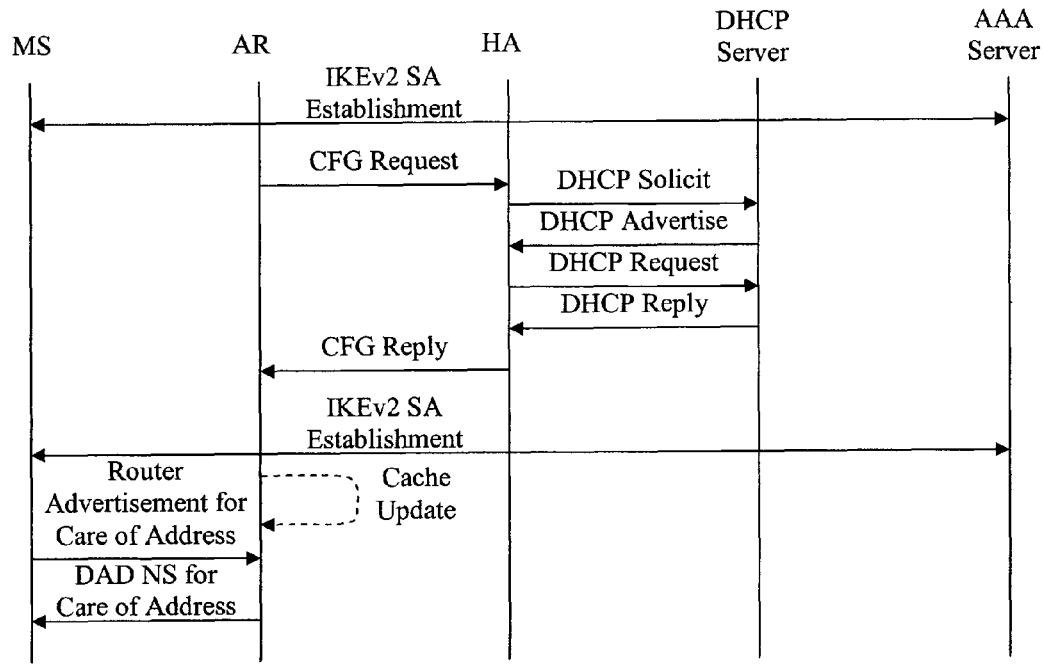
FIG. 3H is an illustration of another embodiment of the prefix assignment process.

FIG. 3H illustrates a specific embodiment of the prefix Mobile IPv6 per-MS assignment process using the Home Agent and IP security. The Home Agent may use the per-MS home network prefix to avoid multi-link subnet issues, for example, when prefix management becomes an issue for the Home Agent. DHCPv6 or AAA based prefix delegation can be used for this purpose. The process may begin when the MS solicits a security association establishment using Internet Key Exchange (IKE) v2. The Home Agent may then get the configuration request message. The LMA and DHCP server may then perform the DHCP Solicit, Advertise, Request, and Reply process described above. The Home Agent may then send back the reply to the configuration request, which contains the HoA. The MS may then use the HoA to send a Binding Update (BU) message to register its care of address. The MAG may update the Address Cache, if desired. The AR may then send the MS a RA with the care of address configuration. Finally, the MS may send the DAD NS with the care of address configuration to the AR. In this process, the home address can be assigned during the bootstrapping process and downloaded into the AR as part of the policy store. The Home Agent may be triggered by the Home AAA (HAAA)-Home Agent protocol, and the Home Agent may get a per-MS prefix from the DHCP server using the DHCP Solicit, Advertise, Request, and Reply process. The Home Agent may assign the HoA from this prefix. The MS may receive the bootstrapping parameters by sending a DHCP Info-Request message and receiving a DHCP Info-Reply message. The MIPv6 per-MS prefix delegation procedure using the AAA is similar to the process described above, with the exception that the DHCP Solicit, Advertise, Request, and Reply process is replaced with the AA-Request and AA-Answer process.

Figure 4A:
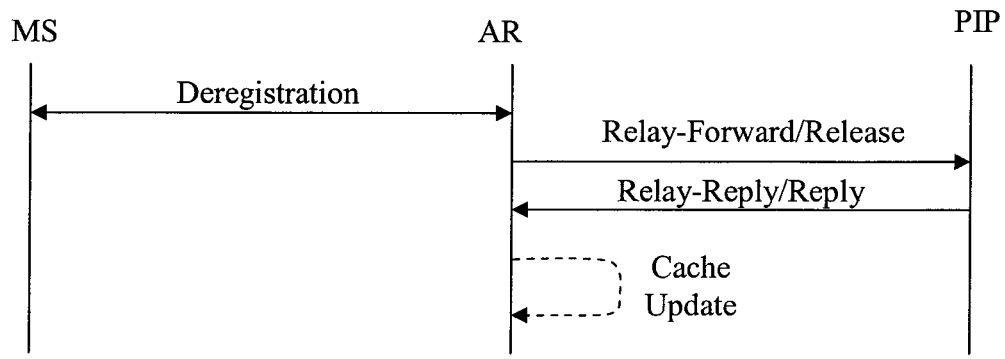
FIG. 4A is an illustration of one embodiment of a prefix release process.

FIG. 4A illustrates a prefix release process. Generally, the prefix may be released when the prefix ages a predetermined amount of time or when the prefix is released. In one embodiment, the prefix is assigned a predetermined validity period by the PIP, after which the MS no longer uses the prefix, and the prefix is released for use by other MSs. In another embodiment, the prefix release process may be initiated when the MS triggers a prefix release procedure using a detachment signal, such as switch-off or handover. Alternatively, the prefix release process may be initiated when deregistration is requested by the MS, one of the network components, or an authorized party. The PIP may then respond to the AR with a reply message that indicates the prefix has been released. The reply message may be in the PIP's protocol. The AR may then update its Address Cache by deleting the prefix information.

In an alternative embodiment, the prefix release may be routed through the Home Agent. In such a case, the communications between the MS and the Home Agent are relayed through the AR and optionally the BS using the MS's or another suitable protocol. The Home Agent then performs the AR's prefix management functions illustrated in FIG. 4A. Specifically, the Home Agent may communicate with the PIP in the PIP's protocol to release the prefix assigned to the MS. The Home Agent may also update its Address Cache by deleting the prefix information. Several specific embodiments of this process are illustrated below.

Figure 4B:
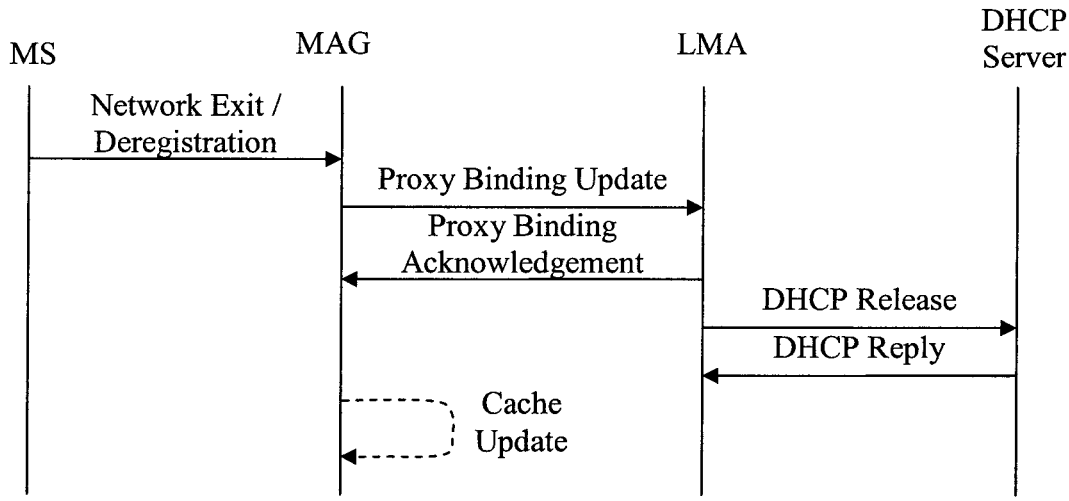
FIG. 4B is an illustration of another embodiment of the prefix release process.

FIG. 4B illustrates a specific embodiment of the prefix release process using a Home Agent. In the present embodiment, the AR is a MAG, the Home Agent is a LMA, and the PIP is a DHCP server. Specifically, the LMA may release the prefix to the DHCP server when it is not directly connected to the LMA. The process may begin when triggered by the MS's detachment signaling, such as switch-off or handover. The MAG may then send a PBU with a lifetime set to zero to the LMA. The LMA may then reply to the MAG with a PBA, and may initiate a release message to give the prefix back to the DHCP server. The DHCP server may then respond with a Reply message, after which the prefix can be reused by another MS. Finally, the MAG may update the Address Cache, if desired.

Figure 4C:
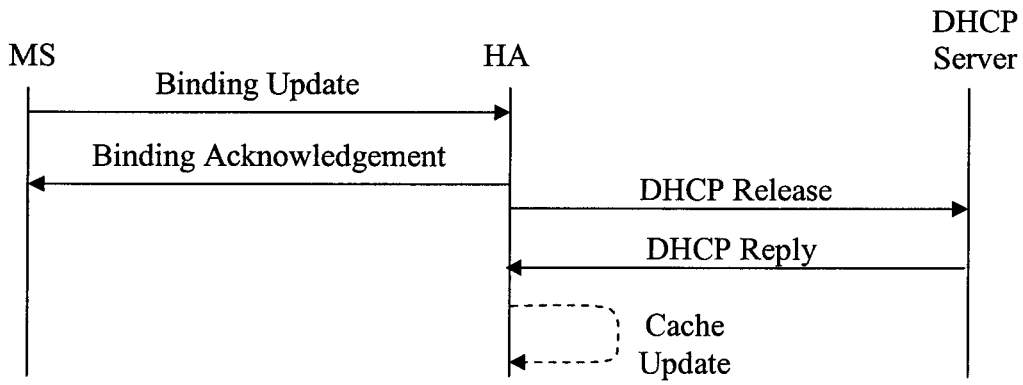
FIG. 4C is an illustration of another embodiment of the prefix release process.

FIG. 4C illustrates another embodiment of the prefix release process using a Home Agent and a DHCP server as the PIP. In the present embodiment, the Home Agent may release the MS's home link prefix when the MS returns home and sends a BU message with the lifetime set to zero. The Home Agent may respond with a Binding Acknowledgement (BA) message, and then the process proceeds as described above. When the PIP is an AAA server, the LMA may release the MS's prefix using an Accounting Stop message or an Accounting Request message when the MS exits the network. The MAG may advertise the prefix to the MS in a RA message. Finally, the MAG may update the Address Cache, if desired.

After the MS receives the prefix, the MS combines the prefix with its interface identifier to make the address. If the prefix and/or the interface identifier are globally unique, then the address will also be unique and there is no need to verify the addresses uniqueness, for example, using the DAD method. However, if the prefix or interface identifier is not globally unique, the address is referred to as a temporary address (TA), and the DAD method may be implemented.

Figure 5:
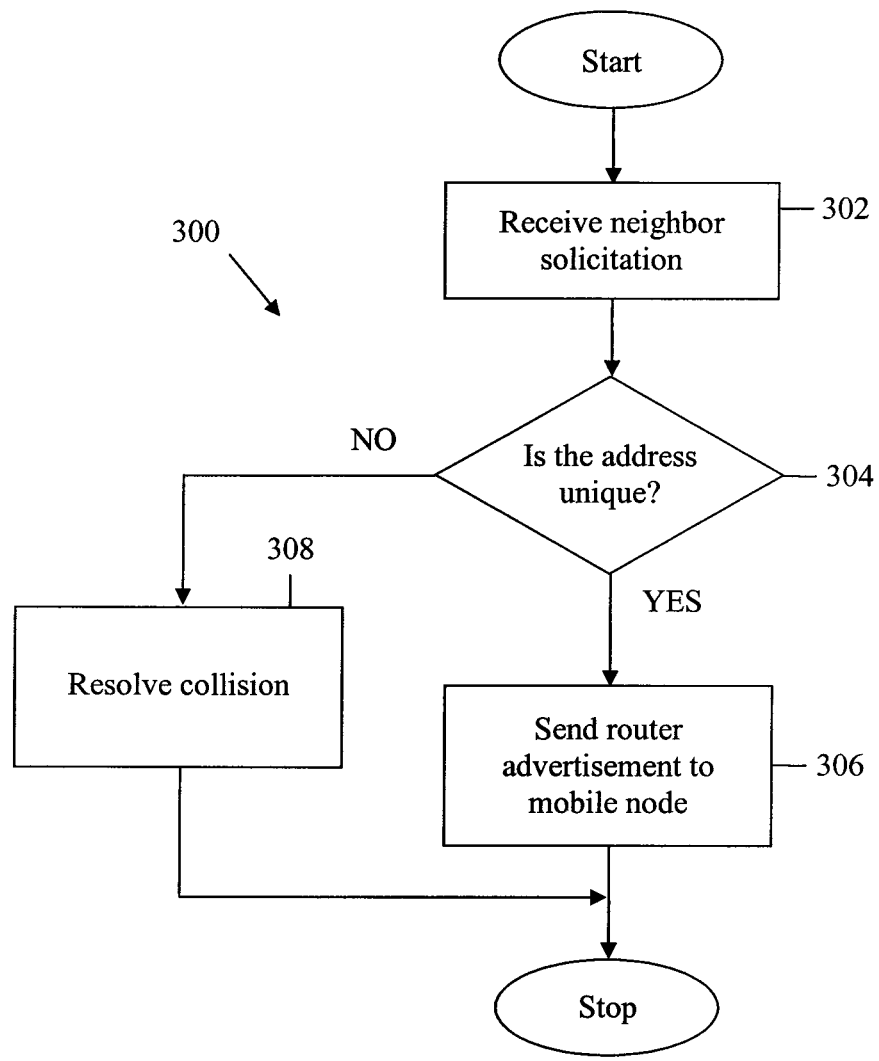
FIG. 5 is a flowchart of one embodiment of a DAD method.

FIG. 5 is a flowchart of one embodiment of a DAD method 300. The DAD method 300 is a process by which the uniqueness of a requesting MS's TA may be verified. Specifically, the DAD method 300 may authenticate the uniqueness of an address created under the shared prefix model, the point-to-point model, the stateful model, or the stateless model. Specifically, in a point-to-point model that includes a plurality of PIPs that may not share address information, the DAD method 300 may be used to verify the uniqueness of the TA. The DAD method 300 may be implemented by an AR, a Home Agent, or a ND node.

At block 302, the DAD request is received from the MS. The DAD request may be in the form of a NS message, and may contain the TA. The NS request may be initiated by the requesting MS and relayed by the AR, or the NS message may be sent via a direct link from the requesting MS node to the ND node. The DAD method 300 then proceeds to block 304, where the DAD method 300 determines whether the TA is unique. Specifically, the AR, Home Agent, or ND node may access an Address Cache and compare the TA with existing MS addresses. The TA will be unique if the TA is not being used by another MS or other node. If the TA is unique, the DAD method 300 proceeds to block 306. If the TA is not unique, the DAD method 300 proceeds to block 308.

At block 306, the DAD method 300 may use a router advertisement to indicate the uniqueness of the TA. Other DAD methods may broadcast the TA to all of the MSs and wait for the other MSs to indicate whether they are using the TA. If one of the MSs is using the TA as its address, then the MS notifies the requesting MS and a collision resolution method is initiated. If none of the MSs respond within a predetermined amount of time, e.g. 1,000 milliseconds, then the requesting MS may assume that the TA is unique. In contrast with this procedure, the DAD method 300 may generate a RA message that indicates that the TA is unique, which may be immediately sent to the MS. The generation of the RA message provides a positive determination as to the uniqueness of the TA, and may reduce the time for the requesting MS to determine whether its TA is unique. If the RA message is generated by the Home Agent, the RA message may be relayed through the AR to the MS. The DAD method 200 then ends.

At block 308, the DAD method 300 resolves the collision between the TA and the existing address. In one embodiment, the DAD method 300 may generate a message indicating that the TA is not unique, and send such a message to the requesting MS. The requesting MS may then select a new TA comprising a new prefix and/or interface identifier. Alternatively, the AR may select a new TA for the requesting MS. The new TA may contain a new prefix obtained, for example, from the PIP and/or a new interface identifier obtained, for example, from the requesting MS or the AR. The uniqueness of the new TA may be verified by comparing the new TA to the Address Cache. In another embodiment, the DAD method 300 may resolve the collision by forwarding the TA to the MS with the existing address. The MS with the existing address may then resolve the conflict by sending a message to the AR specifying that the requesting MS needs to select another address. The DAD method 200 then ends.

Figure 6:
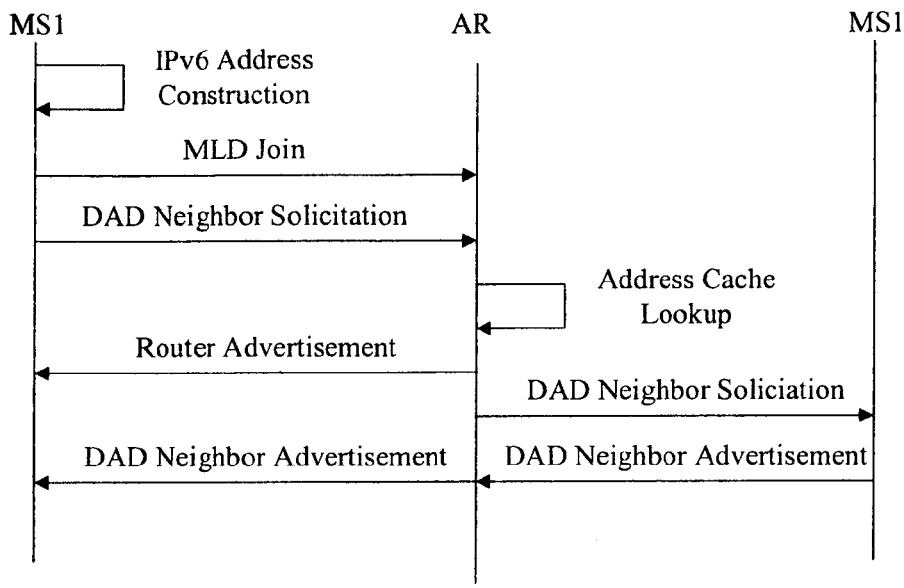
FIG. 6 is an illustration of another embodiment of the DAD method.

FIG. 6 is an illustration of another embodiment of the DAD method. Initially, MS1 may construct an IPv6 address, for example, as described above. MS1 then constructs a solicited node multicast address for the corresponding IPv6 address, e.g. the TA, and send a MLD Join request of the solicited node multicast address. A NS message is then sent to the AR, Home Agent, or other party that contains the Address Cache. The message may be transported directly to the AR via a wireless link or through another node such as a BS. If the TA is unique, the AR forwards a RA message back to the MS with an indication that the address is unique. If the address is not unique, the AR may relay the DAD to the address owner, MS2. MS2 then sends a DAD NA indicating the non-uniqueness of the address to MS1 via the AR. Alternatively, the AR may send a RA message containing a negative tag that indicates the use of the address by another MS, e.g. MS2. In either case, MS1 may discard the TA and repeat the DAD method using another TA. The DAD method may also conclude if MS1 does not receive any RA messages regarding the address uniqueness within a predetermined time, e.g. 1,000 milliseconds.

Figure 7:
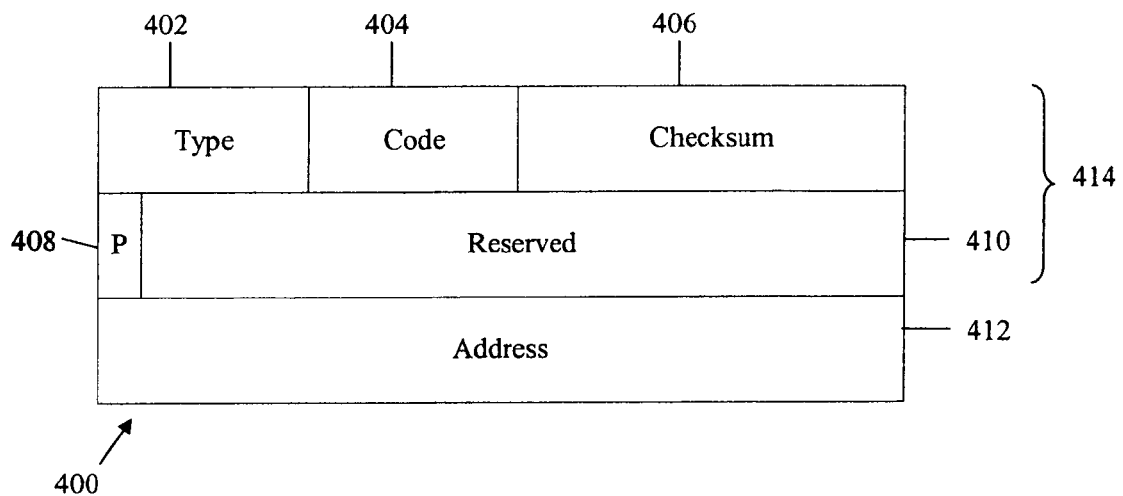
FIG. 7 is an illustration of one embodiment of a network solicitation message format.

FIG. 7 is an illustration of one embodiment of a NS message 400 format. The NS message 400 comprises a header 414 and an address 412. The header 414 may be 32 bits in size, and may include an 8-bit Type field 402, an 8-bit Code field 404, a 16-bit Checksum field 406, a one-bit P field 408, and a 31-bit Reserved field 410. The type field 402 may be used to indicate the type of the message. The Code field 404 may be used to create an additional level of message granularity. The Checksum field 406 may be used to detect data corruption in the message. The P field 408 may be used to indicate whether the NS message 400 is a request to verify the uniqueness of the TA in the message. The Reserved field 410 may be initialized to zero by the sender and ignored by the receiver. The message header 414 may be followed by a 128-bit Address field 412 that may contain the TA. The header 414 and Address field 412 may be succeeded by additional fields of various sizes and functions. In some embodiments, the one-bit P field may only be used to indicate whether the TA is unique, e.g. with the P-bit set to one, or whether the message lacks an indication as to the uniqueness of the TA, e.g. with the P-bit set to zero. In an embodiment, the P field may be located at about the first bit of the second row, which is about the thirty-third bit of the NS message. Persons of ordinary skill in the art will appreciate that the message formats described herein may be modified to include a P field containing a plurality of bits that indicate whether the TA is being used by another MS.

Figure 8:
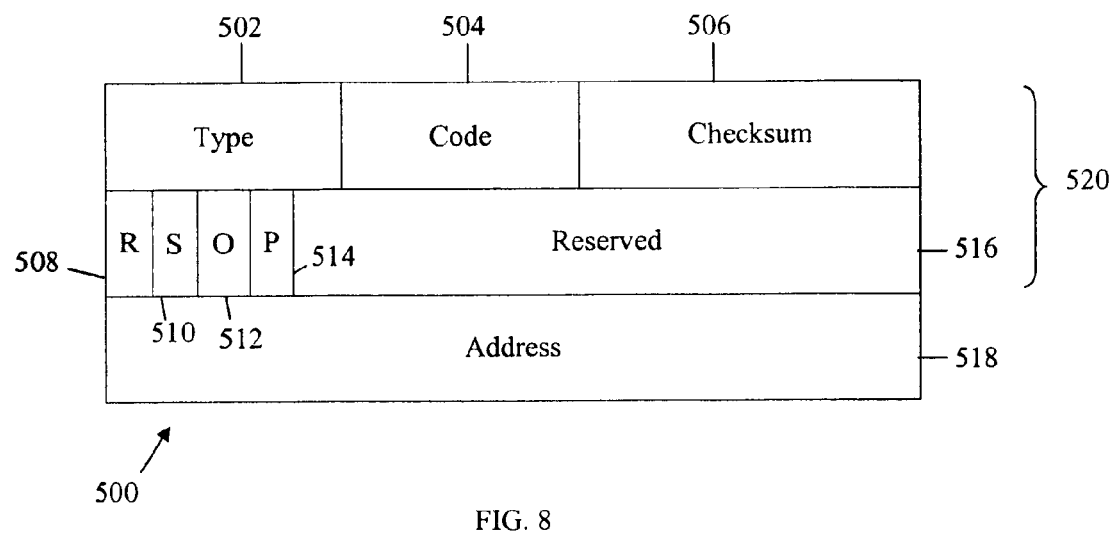
FIG. 8 is an illustration of one embodiment of a router advertisement message format.

FIG. 8 is an illustration of one embodiment of a RA message 500 format. Like the NS message 400 illustrated in FIG. 7, the RA message 500 comprises a header 520 and an address 518. The header 520 may be 32 bits in size, and may include a 4-bit Type field 502, a 4-bit Code field 504, a 16-bit Checksum field 506, a one-bit R field 508, a one-bit S field 510, a one-bit O field 512, a one-bit P field 514, and a 28-bit Reserved field 516. The Type field 502, Code field 504, Checksum field 506, and Reserved field 516 may be substantially the same as those described in FIG. 7. The R field 508 may be used to indicate whether the sender is a router. The S field 510 may be used to indicate whether the RA message 500 is sent in response to a NS message. The O field 512 may be used to indicate whether the RA message 500 should override an existing cache entry. The P field 514 may be used to indicate whether the requested TA is unique. In an embodiment, the P field may be located at about the fourth bit of the second row, which is about the thirty-sixth bit of the RA message. The message header 520 may be followed by a 128-bit Address field 518 that may contain an assigned IPv6 address, and may be succeeded by additional fields of various sizes and functions.

Figure 9:
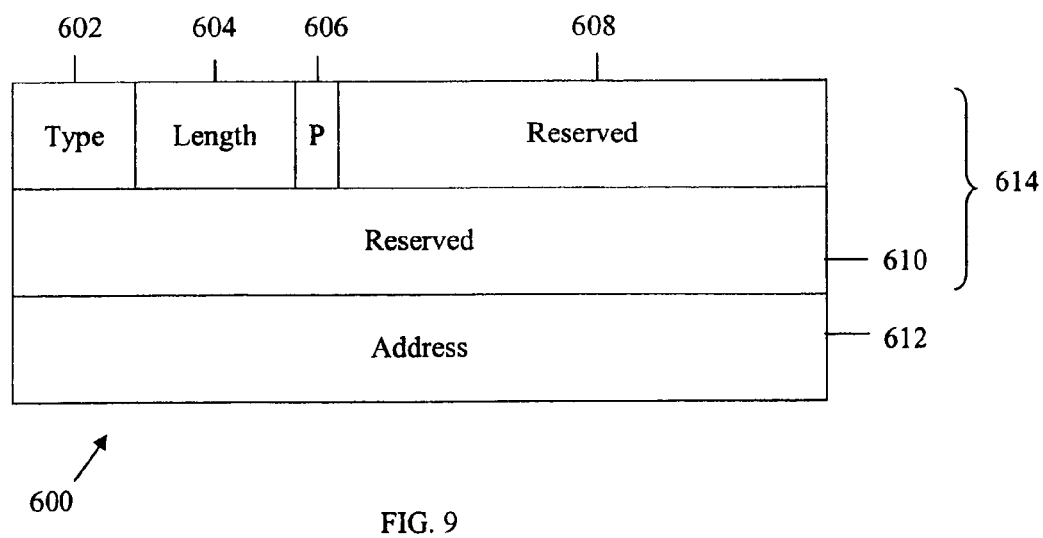
FIG. 9 is an illustration of another embodiment of the router advertisement message format.

FIG. 9 illustrates another embodiment of a RA message 600 format. Like the RA message 500 illustrated in FIG. 8, the RA message 600 comprises a header 614 and an address 612. The header 614 may be 32 bits in size and may include an 8-bit Type field 602, an 8-bit Length field 604, a one-bit P field 606, a 15-bit first Reserved field 608, and a 32-bit second Reserved field 610. The Type field 602, P field 606, the first Reserved field 608, and the second Reserved field 610 may be substantially the same as those described in FIG. 8. In an embodiment, the P field may be located at about the seventeenth bit of the first row, which is about the seventeenth bit of the RA message. The Length field 604 may be used to specify the length of the address in 8-octet units.

Figure 10:
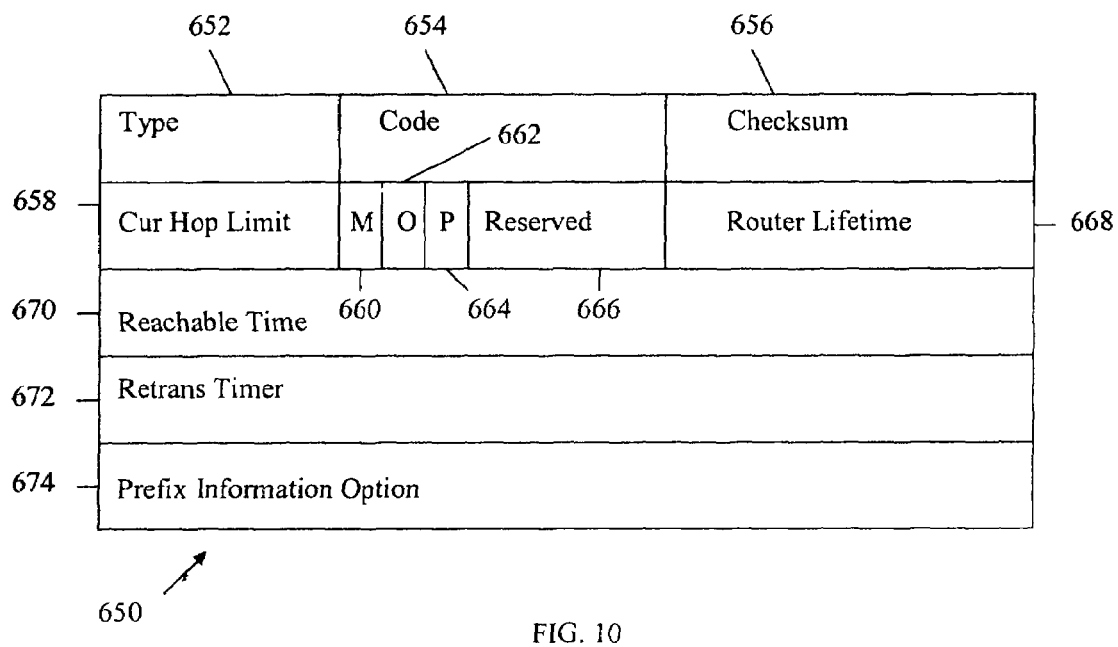
FIG. 10 is an illustration of another embodiment of the router advertisement message format.

FIG. 10 illustrates another embodiment of a RA message 650 format. The RA message 650 may include an 8-bit Type field 652, an 8-bit Code field 654, a 16-bit Checksum field, an 8-bit Cur Hop Limit field 658, a one-bit M field 660, a one-bit O field 662, a one-bit P field 664, a 5-bit Reserved field 666, and a 16-bit Router Lifetime field 668. The RA message 650 may also include a reachable time 670, a Retrans Timer 672, and a Prefix Information Option 674. The Type field 652, Code field 654, Checksum field 656, M field 660, O field 662, P field 656, Reserved field 666 may be substantially the same as those described above. In an embodiment, the P field may be located at about the eleventh bit of the second row, which is about the forty-third bit of the RA message. The Cur Hop Limit field 658 may be a default value that is placed in the Hop Count field of the IP header for outgoing IP packets. The Router Lifetime field 668 may be the lifetime of the default router. The Reachable Time field 670 may be the time period that a node assumes the neighbors are reachable after having received a reachability confirmation. The Retrans Timer field 672 may be the time between retransmitted NS messages. The Prefix Information Option field 674 may be the options that are on-link or are used for address auto-configuration.

Figure 11:
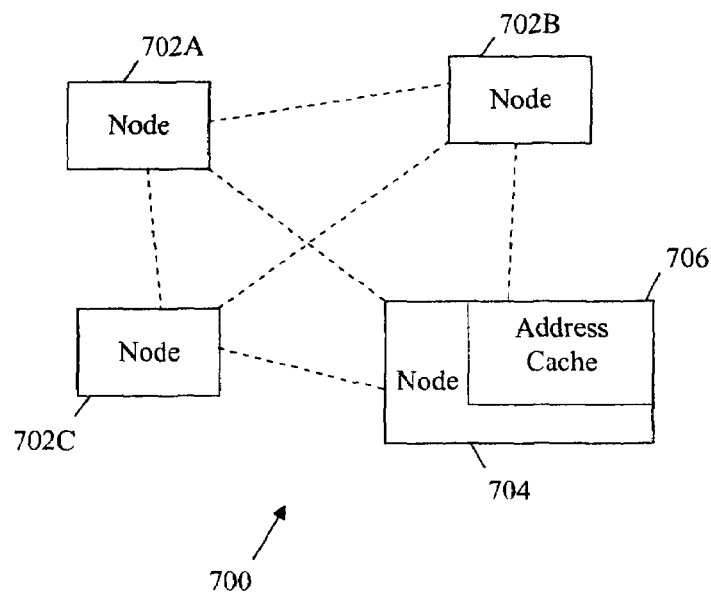
FIG. 11 is an illustration of one embodiment of a wireless system.

FIG. 11 is an illustration of an embodiment of an autonomous wireless system 700 that may implement the DAD method. The system 700 may include a plurality of nodes 702A, 702B, 702C, 702D (collectively 702), and at least one ND node 704. The nodes 702 may be similar to the MSs described above in that they may communicate with one another via a plurality of links, and may be part of a wireless network, such as a cellular network. The ND node 704 may be similar to nodes 702, but may also include an Address Cache 706 that contains the addresses for all the nodes 702 in the network. The Address Cache 706 may be similar to the Address Cache 112 described above.

The DAD method is initiated in the system 700 when a new node, e.g. node 702A, enters the system 700. The node 702A sends a NS message with a TA to the ND node 704. The ND node 704 compares the TA to the node addresses in its Address Cache 706. If the TA is unique, the ND node 704 replies with a RA message to the node 702 confirming the address uniqueness, and the DAD procedure is ended. The node 702 may then use the address until the node exits the system 700. If the TA is not unique, the ND node 704 resolves the collision as described above.

Figure 12:
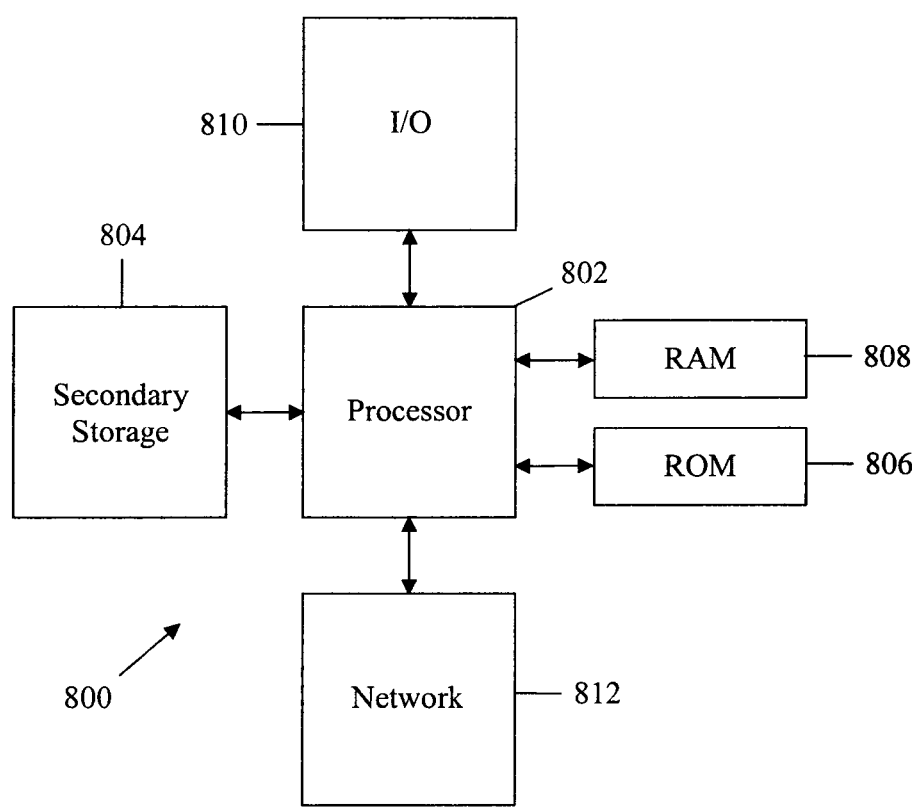
FIG. 12 is an illustration of an exemplary general-purpose computer system suitable for implementing the several embodiments of the disclosure.

The network components described above may be implemented on any general-purpose network component, such as a computer, network, or node, with sufficient processing power, memory resources, and network throughput capability to handle the necessary workload placed upon it. FIG. 12 illustrates a typical, general-purpose network component suitable for implementing one or more embodiments of a node disclosed herein. The network component 800 includes a processor 802 (which may be referred to as a central processor unit or CPU) that is in communication with memory devices including secondary storage 804, read only memory (ROM) 806, random access memory (RAM) 808, input/output (I/O) 810 devices, and network connectivity devices 812. The processor 802 may be implemented as one or more CPU chips. Persons of ordinary skill in the art will appreciate that the computer may contain a plurality of processors 802, where some of the processors 802 may recognize the receipt of and promote the sending of data via the other processors 802.

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage. The RAM 808 is used to store volatile data and perhaps to store instructions. Access to both ROM 806 and RAM 808 is typically faster than to secondary storage 804.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
    a storage device having sets of instructions stored thereon; and
    a processor coupled with the storage device, when the processor executes the sets of instructions, the following method is performed:
    transmitting a request for an address prefix to a prefix issuing party wherein the request is from a local mobility anchor (LMA),
    identifying a reply comprising the address prefix from the prefix issuing party, and
    promoting transmission of a router advertisement comprising the address prefix from a media access gateway (MAG) to a mobile station;
    wherein the LMA uses Proxy Mobile IPv6 to assign the address prefix.

2. The component of claim 1 wherein the prefix issuing party is a Dynamic Host Configuration Protocol (DHCP) server, or an Authentication, Authorization and Accounting (AAA) server.

3. The component of claim 2 wherein the request is a DHCP solicitation and the response is a DHCP reply.

4. The component of claim 2 wherein the request is an AA request and the reply is an AA Answer.

5. The component of claim 1 wherein the address prefix is unique.

6. The component of claim 1 wherein the method further comprises:
    identifying a temporary address from the mobile station, and
    promoting implementation of a duplicate address detection (DAD) method for the temporary address.

7. The component of claim 6 wherein promoting implementation of the DAD method comprises comparing the address to an address cache.

8. The component of claim 7 wherein promoting implementation of the DAD method further comprises adding the address to the address cache when the address is unique.

9. The component of claim 7 wherein promoting implementation of the DAD method further comprises removing the address from the address cache when the mobile station terminates a connection with an access router associated with the address cache.

10. The component of claim 1 wherein the processor is part of a Global System for a Worldwide Interoperability for Microwave Access (WiMAX) wireless network, or a Wireless Fidelity (WiFi) wireless network.

11. A method comprising:
- receiving a request for an Internet Protocol version 6 (IPv6) prefix from a media access gateway;
- assigning the IPv6 prefix to a mobile station through a local mobility anchor (LMA) by using proxy mobile IPv6; and
- sending the IPv6 address to the mobile station;
- wherein the method is implemented at a Dynamic Host Configuration Protocol (DHCP) server or an Authentication, Authorization and Accounting (AAA) server.

12. The method of claim 11 wherein the request is a proxy binding update.

13. The method of claim 11 wherein the request is triggered by entry of the mobile station into the network.

14. The method claim 11 wherein the request is received via a local mobility agent, and the local mobility agent is part of a Global System for a Worldwide Interoperability for Microwave Access (WiMAX) wireless network, or a Wireless Fidelity (WiFi) wireless network.

15. A communications system comprising:
- a plurality of base stations in communication with a plurality of mobile stations;
- an access router in communication with the base stations and a prefix issuing party;
- wherein communications between the access router and the prefix issuing party are routed through a home agent by using proxy mobile IPv6,
- wherein the prefix issuing party issues an address prefix to at least some of the mobile stations;
- wherein a media access gateway (MAG) advertises the address prefix;
- wherein at least some of the mobile stations use the address prefixes to create an internet protocol version 6 (IPv6) address.

16. The system of claim 15 further comprising an address cache located in the home agent.

17. The system of claim 15 wherein the address prefixes issued to the mobile stations are unique.

18. The system of claim 15 wherein the base stations, access router, and home agent are part of a Global System for a Worldwide Interoperability for Microwave Access (WiMAX) wireless network, or a Wireless Fidelity (WiFi) wireless network.

\* \* \* \* \*